United States Patent Office 3,172,875
Patented Mar. 9, 1965

3,172,875
PROCESS FOR TRANSFORMING CHLOROCYANO-
BUTENE INTO VINYLACRYLAMIDE, VINYL-
ACRYLIC ACID AND POLYMERIZATION PROD-
UCTS THEREOF
Gian Paolo Chiusoli, Milan, Italy, assignor to Monteca-
tini Società Generale per l'Industria Mineraria e Chi-
mica, Milan, Italy
No Drawing. Filed May 12, 1958, Ser. No. 734,447
Claims priority, application Italy, May 21, 1957,
7,662/57; Oct. 23, 1957, 15,278/57
28 Claims. (Cl. 260—80.3)

The present invention relates to the preparation of vinylacrylamide, vinylacrylic acid and polymerization products thereof.

The starting material consists of 1-chloro-4-cyano-butene-2. The latter can be obtained economically from 1,4-dichlorobutene and hydrocyanic acid in high yields.

Chlorocyanobutene, when left for some time in contact with conc. hydrochloric acid at temperatures between 0° and 50° C., is completely dissolved to form the amide of δ-chloro-pentenoic acid. The process herein described results in high yields of this amide, by a simple and economical procedure. The solution thus obtained contains a certain amount of unreacted chlorocyanobutene, the amount depending on reaction temperature, reaction time and acid concentration. Chlorocyanobutene is easily extracted from the solution with a solvent therefor such as chloroform, together with small amounts of chloroamide. The reaction time should preferably not be excessively prolonged, to avoid saponification of the chloroamide to chloropentenoic acid. This acid is a colorless solid melting at 64–65° C. and has not been described in the literature until now. It forms readily if the amide is contacted for a comparatively long time with conc. hydrochloric acid. In order to avoid or diminish the saponification of the allyl chlorine atom also, the temperature should preferably not be increased.

Upon treating the chloropentenamide dissolved in water, or upon directly treating its solution in hydrochloric acid, with a base until it evidences a durable or lasting alkaline reaction, there occurs an immediate or a slow formation of a polymeric white mass, depending upon the strength and concentration of the base. By extracting the mother liquors with ether, there is obtained a solid which is crystallizable from benzene, with a melting point of 125–127° C. and which consists of a vinylacrylamide. This amide can be polymerized in the presence of ultraviolet light. If the alkali addition is carried out at a sufficiently high temperature, namely at 40–80° C., and with a concentrated strong alkali, such as sodium hydroxide, preferably adding the alkali solution to the chloroamide solution and not conversely, and while operating in the presence of peroxides and/or ultraviolet light, most of the vinylacrylamide thus formed is precipitated as a polymer.

On the contrary, by operating in a dilute solution at a lower temperature with a less strong alkali, such as ammonia, very low amounts of polymer which deposit after a long time are obtained.

The vinylacrylamide polymer obtained from the aqueous solution, after washing with water appears as an elastic mass which can be drawn into thin sheets. By carefully drying it is transformed into a very hard product. When left in contact with air, without oxidation inhibitors, it becomes brittle.

From the polymer fractions soluble in methyl alcohol, pyridine and dimethyl formamide are obtained.

The polymer can be employed in the fields of resins and rubbers. The presence of double bonds allows the vulcanization thereof by known methods.

From the chloropentenoic acid, by dehydrochlorination with alkali and re-acidification, a mixture of vinylacrylic acid and polymers thereof can be obtained. It is necessary or advantageous to operate under mild conditions in order to avoid excessive de-carboxylation.

The reactions described above are summarized by the following equations:

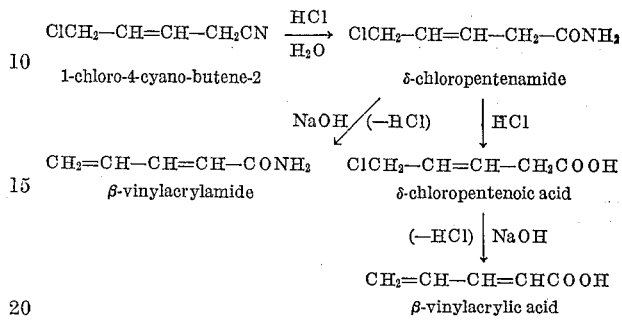

The following examples are presented to illustrate the present invention without however limiting its scope.

Example 1

20 g. chlorocyanobutene are treated at room temperature with 100 cc. conc. hydrochloric acid. After 2 hours the mixture is slowly neutralized, without raising the temperature, and the unreacted chlorocyanobutene is extracted with the required amount of chloroform.

By extraction with ether 10 g. chloropentenamide are recovered which, after crystallization from benzene, melts at 96–97° C.

Example 2

10 g. chloropentenamide in 200 cc. $H_2O$ are treated with 30% ammonia solution at 20° C., the polymer is removed by filtration and the solution is extracted with ether in a Soxhlet apparatus, thus obtaining 4 g. of a product which, after crystallization from benzene, melts at 125–127° C. (β-vinylacrylamide). By exposure to ultraviolet light the product polymerizes.

Example 3

Example 1 is repeated, with the exception that the hydrochloric acid is made to react for 24 hours. Thus an acid ether extract containing δ-chloropentenoic acid, melting point 64–65° C., is obtained.

Example 4

6 g. δ-chloropentenoic acid dissolved in water (200 cc.) are treated with 10% NaOH-solution at room temperature.

By re-acidification with hydrochloric acid and extracting the solution with ether, vinylacrylic acid with a melting point of 70–72° C. and polymers thereof are obtained.

Example 5

20 g. chlorocyanobutene are contacted with 100 cc. of a 36%-hydrochloric acid solution at 13° C. After 2 hours all the chlorocyanobutene is dissolved while the temperature is raised to 22° C.

The unreacted chlorocyanobutene (6 g.) is extracted with the needed amount of chloroform and an amount of 30% sodium hydroxide solution slightly higher than the stoichiometric amount is added to the solution while stirring, in order to neutralize the free hydrochloric acid and that deriving from the dehydrochlorination of chlorocyanobutene. The temperature is left to rise to 60° C., and this temperature is maintained during the entire time by gradually adding the sodium hydroxide within 10 minutes.

A white mass of polymer precipitates immediately.

The solution is left to stand. The vinylacrylamide polymer, separated after 2 hours and carefully washed with water, weighs 5 g. By evaporation of the ether extract of the mother liquor, vinylacrylamide and a further amount of polymer are recovered.

Example 6

When operating as in the preceding example, but with the exception of pouring the solution of the amide into the sodium hydroxide solution, 2.5 g. of vinylacrylamide polymer are obtained.

Example 7

By operating as in Example 5, but under an ultraviolet lamp, a vinylacrylamide polymer is obtained which, after washing with water and drying, weighs 7 g.

Example 8

By operating as in the preceding example, but in the presence of 0.3 g. tert.butyl alcohol hydroperoxide, a vinylacrylamide polymer is obtained which, after washing with water and drying, weighs 10 g.

Example 9

By operating as in Example 5, but with the exception of diluting the solution, after extraction of chloro-cyanobutene, up to 300 cc., and adding sodium hydroxide slowly so that the temperature of 20° C. is not overcome, only a very low portion of polymer is precipitated. By evaporating the ether extract, vinylacrylic acid and some polymer thereof are recovered. By crystallization from benzene, vinylacrylamide with a melting point of 125–127° C. is obtained.

Example 10

20 g. chlorocyanobutene are treated in the presence of tert.butyl alcohol hydroperoxide, with 100 cc. 40% hydrochloric acid solution. Within 7 minutes all the product is dissolved.

6 g. unreacted chlorocyanobutene are extracted with chloroform. By adding a 20% sodium hydroxide solution and allowing the temperature during the neutralization to rise up to 60° C. in the presence of a peroxide, 8.5 g. of vinylacrylamide polymer are recovered after washing with water and drying.

Example 11

20 g. chlorocyanobutene are treated for 2 hours at 0° C. with 100 cc. conc. HCl. The unreacted chlorocyanobutene amounts to 16 g. in this case. By neutralization at 0° C. with a 30% ammonia solution and after standing for some days, 0.1 g. vinylacrylamide polymer are obtained.

Moreover, it has been found that an almost complete conversion of chlorocyanobutene to δ-chloro-β-γ-pentenamide, a better separation of the product and a more pure product can be obtained by passing a gaseous hydrochloric acid current through the concentrated chloropentenamide solution in hydrochloric acid at between 15 and 35° C.

Subsequently the concentrated hydrochloric solution is extracted with chloroform without any dilution. Under said conditions chloroform removes only very low amide amounts. The extraction with chloroform is particularly useful in case chlorocyanobutene is not saponified with gaseous hydrochloric acid and a portion remains unconverted.

After neutralization of the solution, extraction with ether or chloroform and evaporation of the extract, the amide is recovered in the crystalline form.

The chloropentenamide in hydrochloric acid solution is transformed into chloropentenoic acid with time.

This transformation can be effectively carried out as follows: chlorocyanobutene is saponified with hydrochloric acid as mentioned above, the concentrated solution is extracted with chloroform and then diluted with a water volume preferably corresponding to from 1 to 3 times the volumes of the hydrochloric solution and is then left to stand at room temperature.

As a result of the hydrolysis, δ-chloropentenoic acid is formed, most of which is directly separated by filtering. By neutralizing the solution with alkali, and extracting the same with ether or chloroform, the amide not transformed is recovered. Then, by further acidification and extraction, the remaining chloropentenoic acid is obtained.

The acid crystallized from chloroform-petroleum ether melts at 68° C.

The de-hydrochlorination of chloropentenamide to vinylacrylamide takes place by treatment with a base, as disclosed above. It has been found that better results are obtained by adding, at room temperature, an alkali selected from the group comprising sodium or potassium or calcium hydroxide, in absence of peroxides and/or U.V. light, and raising gradually the temperature to 40–70° C.

The ether extraction yields a product in which the amount of polymer is very low, if the ether extract is evaporated at a low temperature (10–20° C.).

The following examples relating to the aforementioned improved processes are reported only to illustrate the present invention, without limiting its scope.

Example 12

20 g. chlorocyanobutene are left in contact with 100 cc. conc. hydrochloric acid (36%) at between 20–35° C. while stirring at intervals.

After two hours the solution is extracted with chloroform. The solution is then neutralized with sodium bicarbonate and extracted with ether. 15 g. crystalline product, which after recrystallization from benzene melts at 96–97° C., are obtained.

Example 13

20 g. chlorocyanobutene are contacted with 100 cc. conc. hydrochloric acid at a temperature of between 20 and 35° C. while stirring and under a gaseous hydrochloric acid stream. After two hours the chloropentenamide is extracted with 50 cc. chloroform, neutralized with sodium bicarbonate and extracted with ether.

19 g. crystalline chloropentenamide which, after recrystallization from benzene, melts at 96/97° C., are obtained.

Example 14

20 g. chlorocyanobutene are treated with 100 cc. conc. hydrochloric acid under gaseous hydrochloric acid stream for two hours at room temperature.

The solution is diluted with an equal water volume and left to stand for 48 hours.

7.7 g. chloropentenoic acid are filtered off. The solution is neutralized with bicarbonate and 5 g. chloropentenamide are extracted with ether. The solution is acidified again and further 4.8 g. chloropentenoic acid are extracted with ether. The chloropentenoic acid, crystallized from petroleum ether-chloroform, melts at 68° C.

Example 15

6 g. δ-chloropentenamide are mixed with 50 cc. H$_2$O and 9 g. 30% NaOH, heating the solution up to 60° C. within 30 minutes while stirring. The solution is then cooled and extracted with ether. The ether extract is evaporated under vacuum on a water bath at 13° C. 3.5 g. β-vinylacrylamide which, after crystallization from benzene, melts at 125–126° C. are recovered.

Example 16

20 g. chlorocyanobutene are treated with 100 cc. conc. hydrochloric acid under a gaseous hydrochloric acid stream for 2 hours at room temperature. 200 g. 30% NaOH are then added while cooling to maintain room temperature, and the solution is then heated to 60° C. for ½ hour.

The solution is extracted with ether, thus obtaining 13 g. vinylacrylamide which melts at between 120 and 125° C. while it becomes resinous. The vinylacrylamide after crystallization from benzene melts at 125–126° C.

I claim:

1. A process comprising treating 1-chloro-4-cyano-butene-2 with an acid, and prolonging the acid treatment sufficiently to produce delta-chloropentenoic acid, subjecting the latter to dehydrochlorination with alkali to yield beta-vinylacrylic acid and homo-polymeric vinylacrylic acid.

2. A process comprising treating 1-chloro-4-cyano-butene-2 with an acid, and prolonging the acid treatment sufficiently to produce delta-chloropentenoic acid, subjecting the latter to dehydrochlorination with alkali to yield beta-vinylacrylic acid and homo-polymeric vinylacrylic acid, the dehydrochlorination being carried out in the presence of ultraviolet light to increase the yield of the homo-polymeric vinylacrylic acid.

3. A process comprising treating 1-chloro-4-cyano-butene-2 with an acid, and prolonging the acid treatment sufficiently to produce delta-chloropentenoic acid, subjecting the latter to dehydrochlorination with alkali to yield beta-vinylacrylic acid and homo-polymeric vinylacrylic acid, the dehydrochlorination being carried out in the presence of a peroxide to increase the yield of the homo-polymeric vinylacrylic acid.

4. A process comprising treating delta-chloropentenoic acid dissolved in water with an alkali, and then acidifying with hydrochloric acid to yield beta-vinylacrylic acid and homo-polymers thereof.

5. A process of making gamma-chloro-beta-pentenamide, of the formula $ClCH_2-CH=CH-CH_2-CONH_2$, comprising treating 1-chloro-4-cyano-butene-2 with a stream of hydrochloride gas at a temperature between about 15 and 35° C., extracting the unreacted chloro-cyano-butene from the concentrated hydrochloric solution with chloroform, neutralizing the solution, and extracting the said pentenamide.

6. A process comprising treating 1-chloro-4-cyano-butene-2 with an acid, and dehydrochlorinating the delta-chloro-pentenamide produced by treatment with a base at between about 0° and 80° C. to yield beta-vinylacrylamide and a homo-polymer thereof.

7. A process of making beta-vinylacrylamide comprising treating aqueous delta-chloro-beta,gamma-pentenamide with a base and extracting said beta-vinylacrylamide from the reaction liquors with an organic solvent for said amide.

8. A process of making beta-vinylacrylamide comprising mixing delta-chloro-beta,gamma-pentenamide with strong alkali at about room temperature, maintaining the mixture thereafter at about 40 to 70° C., extracting with ether, and evaporating the ether extract at a temperature of about 10 to 20° C.

9. A process comprising dehydrochlorinating delta-chloropentenamide of the formula $$Cl-CH_2-CH=CH-CH_2-CONH_2$$

by treating with aqueous ammonia at a temperature below about 40° C., to yield vinylacrylamide, prevailingly in the 1,4-trans form.

10. A process comprising dehydrochlorinating delta-chloropentenamide of the formula $$Cl-CH_2-CH=CH-CH_2-CONH_2$$

with concentrated sodium hydroxide by adding concentrated aqueous sodium hydroxide to an aqueous solution of said amide, at about 40–80° C., in the presence of at least one polymerization accelerator taken from the group consisting of ultraviolet light and a peroxide, to yield vinylacrylamide and a vinylacrylamide homo-polymer, the homo-polymer prevailing in yield over the vinylacrylamide.

11. A process comprising treating 1-chloro-4-cyano-butene-2 with an acid, and dehydrochlorinating the delta-chloropentenamide produced, by treatment of an aqueous solution thereof with alkali metal hydroxide between about 40° and 80° C. in the presence of at least one polymerization accelerator taken from the group consisting of ultraviolet light and a peroxide to yield vinylacrylamide, and a vinylacrylamide homo-polymer thereof, the homo-polymer prevailing in yield over the vinylacrylamide.

12. A process comprising treating 1-chloro-4-cyano-butene-2 with an acid, and dehydrochlorinating the delta-chloropentenamide produced, by treatment of an aqueous solution thereof with alkali metal hydroxide between about 40° and 80° C. to yield vinylacrylamide, and a vinylacrylamide homo-polymer thereof.

13. A process of making beta-vinylacrylamide comprising mixing delta-chloro-beta,gamma-pentenamide with a base taken from the group consisting of sodium, potassium, and calcium hydroxides, in aqueous medium at a temperature not above about 25° C. and gradually raising the temperature to about 40° to 70° C.

14. A process of making vinylacrylamide comprising dehydrochlorinating delta-chloro-beta,gamma-pentenamide by adding to the former a base taken from the group consisting of ammonia, sodium, potassium, and calcium hydroxide, in aqueous medium, at a temperature not above about 25° C. and gradually raising the temperature to about 40° to 70° C.

15. A process of making delta-chloro-pentenoic acid amide and delta-chloro-pentenoic acid, comprising treating 1-chloro-4-cyano-butene-2 with hydrochloric acid in aqueous medium, and, in any sequence, separating the chloro-pentenoic acid from the acid reaction solution, and after addition of a base extracting said amide from the solution with an organic solvent for said amide.

16. A process of making delta-chloro-beta,gamma-pentenamide, comprising treating 1-chloro-4-cyano-butane-2 with concentrated hydrochloric acid at a temperature not higher than about 35° C., extracting the solution with chloroform, neutralizing the solution, and extracting with an organic solvent for said pentenamide.

17. A process comprising dehydrochlorinating aqueous delta-chloro-pentenoic acid, having the formula $$Cl-CH_2-CH=CH-CH_2COOH$$

with sodium hydroxide at a temperature below about 50° C., and acidifying the reaction mixture, to yield beta-vinylacrylic acid and a homo-polymer thereof.

18. A process comprising treating delta-chloropentenoic acid, having the formula $$Cl-CH_2-CH=CH-CH_2COOH$$

with an alkali in aqueous solution to yield beta-vinylacrylic acid and a homo-polymer thereof.

19. A process of making beta-vinylacrylic acid amide comprising dehydrochlorinating aqueous delta-chloropentenamide of the formula $$Cl-CH_2-CH=CH-CH_2-CONH_2$$

by treating with an alkali at a temperature not higher than about 20° C.

20. A process comprising treating 1-chloro-4-cyano-butene-2 with concentrated hydrochloric acid in aqueous medium, dehydrochlorinating, with a base, some of the delta-chloro-beta,gamma-pentenoic acid amide formed into beta-vinylacrylamide and homo-polymers thereof, and subjecting some of the delta-chloro-beta,gamma-pentenoic acid amide to sufficiently prolonged acid treatment to produce delta-chloro-beta,gamma-pentenoic acid.

21. A process comprising treating 1-chloro-4-cyano-butene-2 with concentrated aqueous hydrochloric acid, and dehydrochlorinating, with a base, the solution of delta-chloro-beta,gamma-pentenoic acid amide so obtained into beta-vinylacrylamide and a homo-polymer thereof.

22. A process of preparing beta-vinylacrylamide and its homo-polymer, comprising treating 1-chloro-4-cyano-butene-2 with concentrated hydrochloric acid in aqueous medium, to produce delta-chloro-beta, gamma-pentenoic acid amide, and dehydrochlorinating the latter with a base, forming a mixture of beta-vinylacrylamide and its homo-polymer.

23. A process comprising hydrolyzing 1-chloro-4-cyano-butene-2 with aqueous hydrochloric acid to produce delta-chloropentenamide, part of the latter further hydrolyzing to delta-chloropentenamide acid, interrupting the hydrolysis so that the major part of the hydrolyzate is delta-chloropentenamide, and treating the latter with a base taken from the group consisting of ammonia, and sodium, potassium, and calcium hydroxide, yielding beta-vinylacrylamide and its homo-polymer.

24. A process comprising hydrolyzing 1-chloro-4-cyano-butene-2 with aqueous hydrochloric acid to produce delta-chloropentenamide, part of the latter further hydrolyzing to delta-chloropentenoic acid, interrupting the hydrolysis so that the major part of the hydrolyzate is delta-chloropentenamide, and treating the latter with a base, yielding beta-vinylacrylamide and its homo-polymers.

25. A process of preparing beta-vinylacrylamide and its homo-polymer, comprising treating 1-chloro-4-cyano-butene-2 with concentrated hydrochloric acid in aqueous medium, to produce delta-chloro-beta, gamma-pentenoic acid amide, and dehydrochlorinating the latter with a base, forming a mixture of beta-vinylacrylamide and its homo-polymer, the dehydrochlorinating being carried out with an aqueous base taken from the group consisting of aqueous ammonia, sodium, potassium, and calcium hydroxide, at a temperature between about 40° to 80° C., the base being employed in an amount to neutralize the acid in said aqueous medium and to produce a lasting alkaline reaction.

26. A process of making beta-vinylacrylamide homopolymer which is elastic, vulcanizable, and can be drawn into thin sheets, comprising dehydrochlorinating delta-chloro-pentenamide by treatment thereof with a base in water, the base being sufficient to result in lasting alkalinity, separating the beta-vinylacrylamide polymer which forms.

27. A process of making beta-vinylacrylamide homopolymer which is elastic, vulcanizable, and can be drawn into thin sheets, comprising dehydrochlorinating delta-chloro-pentenamide by treatment thereof with a base in water, the base being sufficient to result in lasting alkalinity, separating the beta-vinylacrylamide polymer which forms, said base being a concentrated strong alkali, the process being carried out in the presence of a peroxide polymerization catalyst, to precipitate most of the beta-vinylacrylamide as the polymer.

28. The process of claim 26, and extracting beta-vinylacrylamide from the mother liquor with an organic solvent for said beta-vinylacrylamide.

References Cited by the Examiner

UNITED STATES PATENTS

| | | | |
|---|---|---|---|
| 2,073,363 | 3/37 | Carothers et al. | 260—80 |
| 2,251,946 | 8/41 | Lott | 260—561 |
| 2,477,672 | 8/49 | Webb et al. | 260—465.8 |
| 2,477,674 | 8/49 | Whitman | 260—465.8 |
| 2,754,323 | 7/56 | Anderson | 260—89.7 |

FOREIGN PATENTS 647,420  12/50  Great Britain.

OTHER REFERENCES

Noller: "Chemistry of Organic Compounds," W. B. Saunders Co., Philadelphia, Pa., 1958, pages 151, 252., 1957.

Holman et al.: "Progress in the Chemistry of Fats and Other Lipids," Pergamon Press, New York, N.Y., 1958, vol. 5, page 26.

Beilstein: Organische Chemie, Band 2 (1920), p. 427.

Fetizone et al.: Academie Des Sciences Comptes Rendus, vol. 235, Pages 1654–6, (1952).

Snyder et al.: Journal American Chemical Society, vol. 72, Pages 4096–4103, (1950).

Groggins: "Unit Processes in Organic Synthesis," Pages 219–220, McGraw-Hill Book Company, New York, (1952).

Coffman: "American Chemical Society Journal," vol. 57, Pages 1981–1984, (October, 1935).

Doebner: "Berichte Deutsche Chem. Gesellschaft," vol. 35, Pages 1136–1143 (1902).

L. J. BERCOVITZ, *Primary Examiner.*

N. MARMELSTEIN, M. STERMAN, P. E. MANGAN, H. BURNSTEIN, *Examiners.*

UNITED STATES PATENT OFFICE
CERTIFICATE OF CORRECTION

Patent No. 3,172,875            March 9, 1965

Gian Paolo Chiusoli

It is hereby certified that error appears in the above numbered patent requiring correction and that the said Letters Patent should read as corrected below.

In the heading to the printed specification, line 11, for "15,278/57" read -- 15,287/57 --.

Signed and sealed this 17th day of August 1965.

(SEAL)
Attest:

ERNEST W. SWIDER
Attesting Officer

EDWARD J. BRENNER
Commissioner of Patents